July 18, 1950  E. PIETZ  2,515,422
VIBRATION ISOLATOR
Filed March 8, 1947

Inventor:
Ervin Pietz
Charles E. Crede
Agent

Patented July 18, 1950

2,515,422

UNITED STATES PATENT OFFICE 2,515,422

VIBRATION ISOLATOR

Ervin Pietz, Medford, Mass., assignor to L. N. Barry Co., Inc., a corporation of Massachusetts Application March 8, 1947, Serial No. 733,276

9 Claims. (Cl. 248—358)

My invention relates to flexible mountings, known as isolators or absorbers, which are used to prevent or reduce the transmission of vibration impact or noise between structures which must be mechanically connected. For example, isolators are used for mounting machines or devices which create disturbances likely to cause misoperation or deterioration of adjacent instruments or equipment. Examples falling in this category are: motors, fans, solenoid actuated devices, and other apparatus whose operation sets up dynamic forces.

Another application is for mounting delicate apparatus that must be protected from vibrations and impacts which are generated by adjacent machinery. A primary application in this category is for mounting instruments and electronic equipment in airplanes. It is also desirable to mount phonograph pickups on vibration isolators to prevent vibration and noise feeding back from the speaker to the pick-up. Vacuum tubes, condensers, and other components of electronic equipment are commonly mounted on vibration isolators both to protect the components from damage and to prevent misoperation which results from sudden movement of the component.

My invention utilizes rubber in flexure as contrasted to rubber in shear or compression as used in other types of isolators. The use of rubber in flexure makes possible the large static deflections required to isolate low frequency vibrations. It is also possible by using rubber in flexure to obtain a relatively low stiffness in all directions to isolate the vibrations impressed from many sides.

An object of my invention is to provide a vibration isolator which is capable of withstanding relatively large static deflections so as to be useful for isolating very low frequency vibrations.

Another object of my invention is to provide a vibration isolator capable of supporting very light loads and whose size is very small to enable its use in the small spaces encountered with light weight equipment.

Another object is to provide a vibration isolator which may be conveniently attached to the adjacent structures without making it necessary to use the costly manufacturing operations necessary to bond metal to rubber. The resulting isolator is, therefore, characterized by its low cost compared with the usual bonded type isolators.

A further object is to provide a vibration isolator which may be made adaptable to a wide range of mounting conditions and loads.

Another object of my invention is to provide a vibration isolator which may be conveniently assembled without the use of bolts, nuts, or other locking means.

A further object is to provide an isolator which may be used for securely locking the supported structure in place during service conditions but which structure may be easily and conveniently removed when desirable for servicing or other purposes.

A still further object is to provide a vibration isolator which may be used for attaching a supported structure to a sub-adjacent supporting structure without requiring access to the lower side of the supporting structure.

A still further object is to provide a vibration isolator which may be easily and conveniently attached to a wooden supported structure such as is commonly used in phonographs.

Other objects and advantages of my invention will be apparent from the following detailed description and accompanying drawings.

Figure 1:
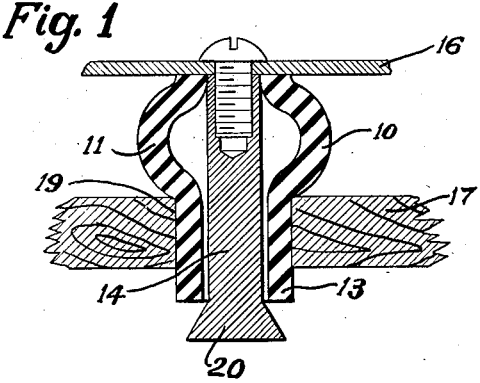
Figure 1 is a sectional view showing the vibration isolator in normal load carrying position.

Figure 1 illustrates a preferred embodiment of my invention in which the isolator 10, comprised of rubber or other resilient material, is formed of a substantially hollow spherical shape 11 having an aperture at its upper end and a depending cylindrical part 13 at its lower end. The center pin 14 is rigidly attached to the supported structure 16 and extends downwardly through the isolator 10. The upper end of the pin 14 fits snugly within the aperture in the isolator. The load of the supported structure 16 is transmitted to the supporting structure 17 through the isolator, the sphere-like portion of the isolator bulging outwardly as the vertical load is applied to its upper end. The lower cylindrical part 13 of the isolator fits snugly within the aperture 19 in the supporting structure 17 and is spaced from the pin 14. The pin 14 terminates at its lower end in a downwardly and outwardly increasing section 20 whose maximum diameter is slightly less than the diameter of the aperture 19 in the supporting structure 17.

Figure 2:
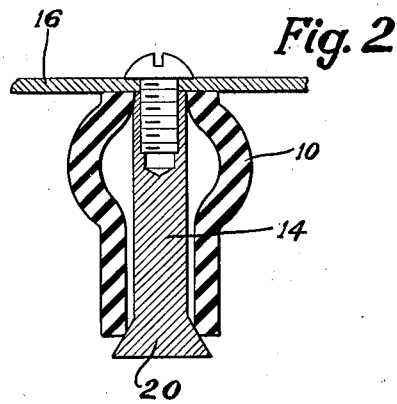
Figure 2 is a similar view of the vibration isolator disassembled from the supporting structure showing its condition when unloaded.

The method of assembling the isolator is illustrated in Figure 2. The assembled rubber part 10 and center pin 14 are attached to the supported structure 16. When unloaded, the lower end of the rubber part is slightly compressed against the flared part 20 of the center pin 14. This assembly is then inserted into the aperture 19 in the supporting structure 17 and the application of the load depresses the flared surface of the center pin slightly below the lower edge of the rubber part. When in this condition the device functions as a vibration isolator and the load is carried entirely by the sphere-like rubber part. The supported structure 16 is thus free to move in any direction relative to the supporting structure.

Figure 3:
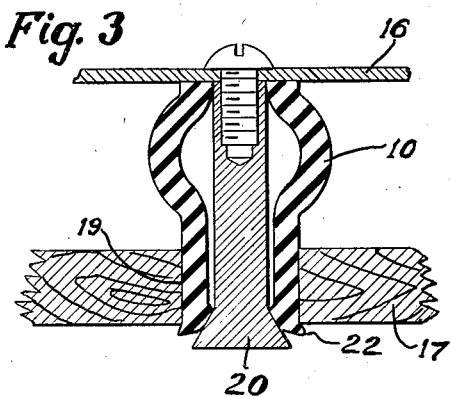
Figure 3 is a view similar to Figure 1 showing the condition of the isolator under application of an upward load to the supported structure.

The method of attachment is illustrated by Figure 3. Any attempt to remove the rubber part 10 from the supporting structure 17 by an upward force on the supported structure 16 results in trapping the lower end 22 of the rubber part between the flared part 20 of the center pin 14 and the supporting structure 17. This effectively prevents its removal from the aperture 19 and provides an attachment of great strength between the supporting (17) and supported (16) structures.

Figure 4:
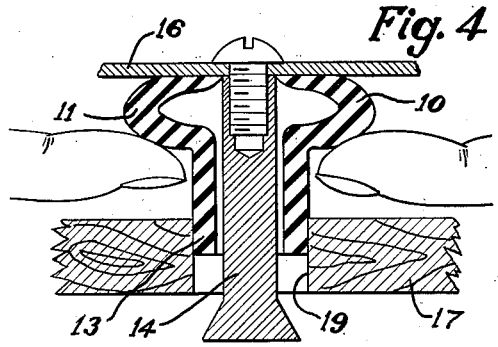
Figure 4 is a view similar to Figure 3 showing the method of disassembling the supported structure from the supporting structure.

The method of effecting the removal is illustrated by Figure 4. The lower or cylindrical part 13 of the rubber piece 10 may be withdrawn from the aperture 19 in the supporting structure 17 before the center pin 14 is pulled upwardly thereby making possible the removal of the pin. One method of removing the cylindrical part 13 from the aperture 19 is by applying an upward force to the lower side of the sphere 11 by the fingers, as illustrated in Figure 4.

Figure 5:
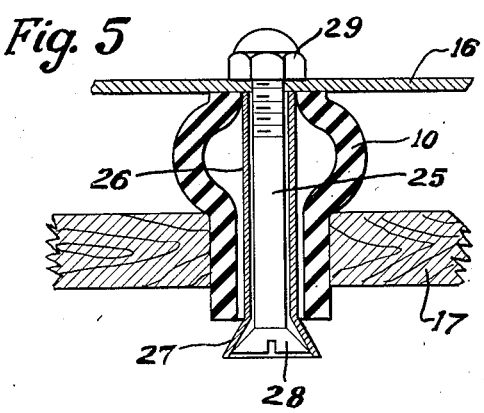
Figure 5 is a view similar to Figure 1 showing a modification in the mechanical arrangement.

Figure 5 illustrates a slightly different mechanical detail in which the center pin 25 takes the form of a sleeve 26 with a flared lower end 27 and which is held in place by a flat head screw 28 inserted through the sleeve 26 and retained at its upper end by a nut 29 or other fastener.

Figure 6:
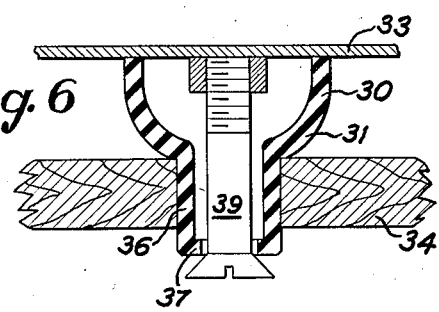
Figure 6 shows another embodiment with modified resilient element.

In the modification shown in Figure 6, the resilient element 30 embodies a hemispherical upper part 31 which flexes to permit horizontal and vertical movement of the supported structure 33 with respect to the supporting structure 34. The cylindrical lower part 36 protrudes through an aperture in the supporting structure 34. The cylindrical part 36 terminates in an inwardly projecting flange 37 which functions to space the center pin or bolt 39 from the body of the cylindrical part 36. The embodiment of the invention illustrated in Figure 6 functions in the manner shown in Figures 3 and 4 with respect to retention in and removal from the supporting structure.

The accompanying drawings illustrate the preferred form of the invention, although it is to be understood that the invention is not limited to the exact details of construction shown and described; as it is obvious that various modifications thereof, within the scope of the claims, will occur to persons skilled in the art.

I claim:

1. In a vibration isolating assembly, the combination of a wooden supporting member, a supported member, a vibration isolator comprising a hollow, substantially spherical part made of resilient material and interposed between said members, said part being loaded in compression by the weight of said supported member, and a depending tubular portion formed integral with said part and extending substantially through an aperture in said supporting member, and a rigid stud attached to said supported member and extending through said part and said portion, said stud terminating in a downwardly and an outwardly flaring enlargement arranged to be out of contact with said portion when the resilient part of the isolator is deflected and arranged to slightly expand the lower end of said portion when the resilient part of the isolator is substantially undeflected.

2. In a vibration isolating assembly, the combination of substantially parallel supporting and supported members, a vibration isolator comprising a hollow, substantially spherical part made of resilient material and interposed between said members, said part being loaded in compression by the weight of the upper member, and a depending tubular portion formed integral with said part and extending substantially through an aperture in the lower member, and a rigid stud attached to the upper member and extending through said part and said portion, said stud terminating in an outwardly flaring enlargement arranged to be out of contact with said portion when the resilient part of the isolator is deflected and arranged to slightly expand the lower end of said portion when the resilient part of the isolator is substantially undeflected.

3. The combination of supporting and supported members, a vibration isolator interposed therebetween, and means attached to one of said members, said isolator comprising a resilient part interposed between said members and a portion extending through an aperture in the other of said members, said portion having an opening through which said means extends, an enlargement on said means adjacent the outer end of said portion, said enlargement being arranged to pass through said aperture, the dimensions of said combination being such that said enlargement is engaged with said portion when said resilient part is substantially undeflected, and is disengaged from said portion when said resilient part is deflected.

4. The combination of supporting and supported members, a vibration isolator interposed therebetween, and means attached to said supported member, said isolator comprising a resilient part interposed between said members and a portion extending through an aperture in said supporting member, said portion having an opening through which said means extends, an enlargement on said means adjacent the outer end of said portion, said enlargement being arranged to pass through said aperture, the dimensions of said combination being such that said enlargement is engaged with said portion when said resilient part is substantially undeflected, and is disengaged from said portion when said resilient part is deflected.

5. The combination of supporting and supported members, a vibration isolator interposed therebetween, and a stud attached to one of said members, said isolator comprising a resilient part interposed between said members and a portion extending through an aperture in the other of said members, said portion having an opening through which said stud extends and terminates in an outwardly flaring enlargement adjacent the outer end of said portion, the dimensions of said combination being such that said enlargement is engaged with said portion when said resilient part is substantially undeflected, and is disengaged from said portion when said resilient part is deflected.

6. A vibration isolator adapted for use with supporting and supported members comprising, a resilient part arranged to be interposed between said members and a portion arranged to protrude through an aperture in one of said members, said isolator having an opening extending therethrough, and being adapted for use with means attached to the other of said members and extending through said opening, said means having an enlargement which is engaged with the outer end of said portion when the resilient part of the isolator is substantially undeflected and disengaged when the resilient part is deflected.

7. A vibration isolator adapted for use with supporting and supported members comprising, a hollow substantially spherical resilient part arranged to be interposed between said members and a tubular portion arranged to protrude through an aperture in one of said members, said isolator being adapted for use with means attached to the other of said members and extending through said spherical part and said tubular portion, said means having an enlargement which is engaged with the outer end of said portion when the resilient part of the isolator is substantially undeflected and disengaged when the resilient part is deflected.

8. A vibration isolator adapted for use with supporting and supported members, comprising a resilient part arranged to be interposed between said members and a portion arranged to protrude through an aperture in said supporting member, said isolator having an opening extending therethrough and being adapted for use with depending means attached to said supported member and extending through said opening, said means having an enlargement which is engaged with the lower end of said portion when the resilient part of the isolator is substantially undeflected and disengaged when the resilient part is deflected.

9. A vibration isolator adapted for use with supporting and supported members comprising, a resilient part arranged to be interposed between said members and a portion arranged to protrude through an aperture in one of said members, said isolator having an opening extending therethrough and being adapted for use with a rigid stud attached to the other of said members and extending through said opening, said means having an outwardly flaring enlargement at its end which is engaged with the outer end of said portion when the resilient part of the isolator is substantially undeflected and disengaged when the resilient part is deflected.

ERVIN PIETZ.

REFERENCES CITED

The following references are of record in the file of this patent:

UNITED STATES PATENTS

| Number | Name | Date |
|---|---|---|
| 1,935,202 | Chamberlain et al. | Nov. 14, 1933 |

FOREIGN PATENTS

| Number | Country | Date |
|---|---|---|
| 143,349 | Switzerland | Jan. 16, 1931 |